United States Patent
Hicks (10) Patent No.: US 9,403,499 B2
(45) Date of Patent: Aug. 2, 2016

(54) ENERGY ABSORBENT SLIDER STOP AND REAR UNDERRIDE PROTECTION SYSTEM

(71) Applicant: SAF-HOLLAND, Inc., Holland, MI (US)

(72) Inventor: William J. Hicks, Muskegon, MI (US)

(73) Assignee: SAF-HOLLAND, Inc., Holland, MI (US)

( * ) Notice: Subject to any disclaimer, the term of this patent is extended or adjusted under 35 U.S.C. 154(b) by 0 days.

(21) Appl. No.: 14/818,690

(22) Filed: Aug. 5, 2015

(65) Prior Publication Data
US 2016/0121688 A1    May 5, 2016

Related U.S. Application Data

(60) Provisional application No. 62/072,157, filed on Oct. 29, 2014.

(51) Int. Cl.
| | |
|---|---|
| B60R 19/56 | (2006.01) |
| B62D 21/15 | (2006.01) |
| B62D 21/11 | (2006.01) |
| B60R 19/26 | (2006.01) |
| B60R 21/00 | (2006.01) |

(52) U.S. Cl.
CPC .............. *B60R 19/56* (2013.01); *B60R 19/26* (2013.01); *B62D 21/11* (2013.01); *B62D 21/15* (2013.01); *B60R 2021/0011* (2013.01)

(58) Field of Classification Search
CPC ........ B60R 19/56; B60R 19/26; B60R 19/30; B60R 19/32; B60R 19/34; B60R 19/36; B60R 19/565; B60R 2021/0011; B60R 2021/002; B60R 2021/0069; B62D 21/11; B62D 21/15
See application file for complete search history.

(56) References Cited

U.S. PATENT DOCUMENTS

| | | | | |
|---|---|---|---|---|
| 3,913,963 A | * | 10/1975 | Persicke | B60R 19/56 180/274 |
| 4,247,138 A | * | 1/1981 | Child | B60R 19/56 293/103 |
| 4,541,661 A | * | 9/1985 | Hawk | B60R 3/00 182/89 |
| 5,673,953 A | * | 10/1997 | Spease | B60R 19/56 293/118 |
| 6,604,765 B1 | | 8/2003 | Eull | |
| 6,764,116 B2 | * | 7/2004 | Ledford | B60R 19/56 293/102 |
| 6,974,166 B2 | * | 12/2005 | Ledford | B60R 19/56 293/102 |
| 7,284,788 B1 | * | 10/2007 | Barbat | B60R 19/34 293/133 |

(Continued)

OTHER PUBLICATIONS

Venkata Kiran Kumar Bodapati, Evaluation of Energy Absorbing Pliers Underride Guards for Rear and Side of Large Trucks, Dec. 2006, 147 pgs.

(Continued)

*Primary Examiner* — Drew Brown
(74) *Attorney, Agent, or Firm* — Price Heneveld LLP (57) ABSTRACT

A vehicle impact energy absorption arrangement includes a vehicle frame, a slider suspension arrangement coupled to the vehicle frame and including an axle member, and a spring member biasing the axle member, and an impact force absorbing arrangement that includes a mounting member coupled to the vehicle frame, first and second pivot members each pivotably coupled to the mounting member, and an elastically deformable biasing member positioned between each of the pivot members and the mounting member, wherein each of the pivot members is configured to pivot and elastically deform the at least one biasing member when impacted.

19 Claims, 5 Drawing Sheets

(56) References Cited

U.S. PATENT DOCUMENTS

2004/0119303 A1* 6/2004 Gollungberg ........... B60R 19/56 293/132
2004/0217603 A1* 11/2004 Ledford .................. B60R 19/56 293/102
2006/0119116 A1* 6/2006 Goertz .................. B60R 19/565 293/132

OTHER PUBLICATIONS

"Uni-Guard Rear Impact Guard", TransFreight Technology, 2 pgs., [Retrieved from http://www.transfreighttech.com].
"Rear Underrun Protection Device or Rear Underride", GrabCAD, 2 pgs., [Retrieved from https://grabcad.com/requests/rear-underrun-protection-device-or-rear-under-ride].
Berg et al., Passive Safety of Trucks in Frontal and Rear-End Collision with Cars, 10 pgs.

* cited by examiner

ENERGY ABSORBENT SLIDER STOP AND REAR UNDERRIDE PROTECTION SYSTEM

BACKGROUND OF THE INVENTION

The present invention relates to a vehicle suspension system and in particular to a vehicle suspension impact energy absorption arrangement and integrated rear impact collision safety arrangement.

BRIEF SUMMARY OF THE INVENTION

A vehicle impact energy absorption arrangement comprises a vehicle frame, a slider suspension arrangement coupled with the vehicle frame, and an impact force absorbing arrangement. The slider suspension arrangement comprises at least one trailing arm member having a first end and a second end, a support bracket coupled to the vehicle frame and pivotably supporting the first end of the first trailing arm, and a spring member positioned between the second end of the trailing arm and the vehicle frame. The impact force absorbing arrangement comprises a mounting member coupled to the vehicle frame, a first pivot member pivotably coupled to the mounting member, a second pivot member pivotably mounted to the mounting member, at least one elastically deformable biasing member positioned between the first pivot member and the mounting member and between the second pivot member and the mounting member, wherein the first pivot member is configured to pivot and elastically deform the at least one biasing member when impacted by the slider suspension arrangement, and wherein the second pivot member is configured to pivot and elastically deform the at least one biasing member when the second pivot member receives a forwardly directed force.

Another aspect of the present invention is to provide a vehicle impact energy absorbing arrangement that includes a vehicle frame, a slider suspension arrangement coupled to the vehicle frame, and an impact force absorbing arrangement. The slider suspension arrangement comprises at least one trailing arm member having a first end and a second end, a support bracket coupled to the vehicle frame and pivotably supporting the first end of the at least one trailing arm, and a spring member positioned between the second end of the trailing arm and the vehicle frame. The impact force absorbing arrangement comprises a mounting member coupled to the vehicle frame, a first pivot member pivotably coupled to the mounting member and at least one elastically deformable biasing member positioned between the first pivot member and the mounting member, wherein the first pivot member is configured to pivot and elastically deform the at least one biasing member when impacted by the slider suspension arrangement.

Yet another aspect of the present invention is to provide a vehicle impact energy absorbing arrangement that includes a vehicle frame, a slider suspension arrangement coupled to the vehicle frame, and an impact force absorbing arrangement. The slider suspension arrangement includes at least one trailing arm having a first end and a second end, a support bracket coupled to the vehicle frame and pivotably supporting the first end of the at least one trailing arm, and a spring member positioned between the second end of the trailing arm and the vehicle frame. The impact force absorbing arrangement includes a mounting member coupled to the vehicle frame, a first pivot member pivotably coupled to the mounting member, and at least one elastically deformable biasing member positioned between the first pivot member and the mounting member, wherein the first pivot member is configured to pivot and elastically deform the at least one biasing member when impacted by the slider suspension arrangement.

Still yet another aspect of the present invention is to provide a vehicle impact force absorbing arrangement for use on a vehicle that includes a slider suspension arrangement, the vehicle impact force absorbing arrangement including a mounting member coupled to the vehicle frame, a first pivot member pivotably coupled to the mounting member, a second pivot member pivotably coupled to the mounting member, at least one elastically deformable biasing member positioned between the first pivot member and the mounting member and between the second pivot member and the mounting member, wherein the first pivot member is configured to pivot and elastically deform the at least one biasing member when impacted by the slider suspension arrangement, and wherein the second pivot member is configured to pivot and elastically deform the at least one biasing member when the second pivot member receives a forwardly directed force.

The principle objects of the present invention are to provide a durable, impact force absorbing arrangement that can be easily and quickly assembled, may be retrofit onto existing trailer assemblies, is economical to manufacture, capable of a long operating life, reduces damage typically associated with excessive force being applied by an operator to a slider suspension assembly, increases the safety of passengers in a vehicle that collides with the rear of a trailer assembly while simultaneously reducing the damage to the trailer typically associated with rear collisions, and is particularly well adapted for the proposed use.

These and other advantages of the invention will be further understood and appreciated by those skilled in the art by reference to the following written specification, claims, and appended drawings.

DETAILED DESCRIPTION OF THE PREFERRED EMBODIMENTS

Figure 1:
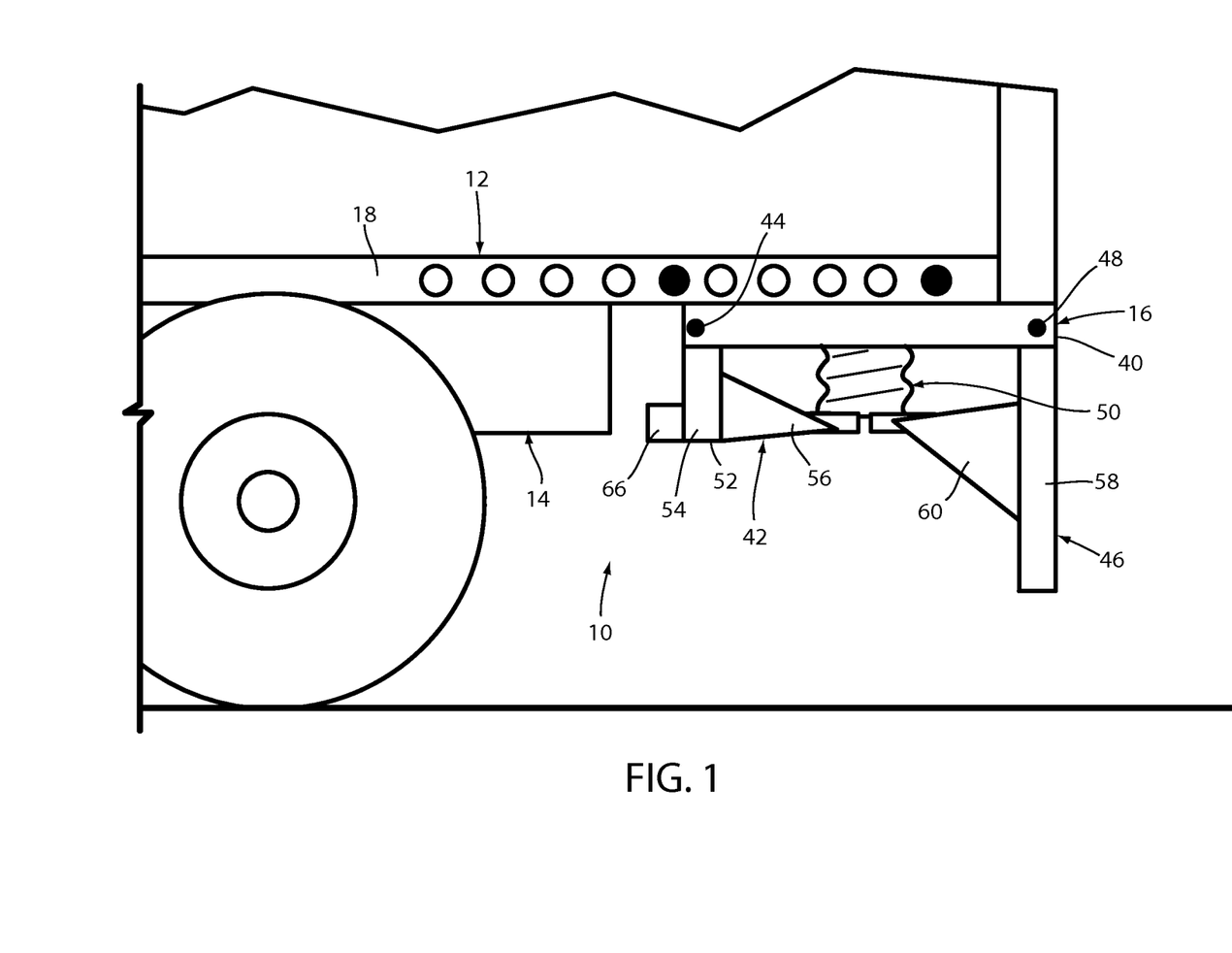
FIG. 1 is a partial side elevational view of a vehicle impact energy absorption arrangement mounted to an associated vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates a vehicle impact energy absorption arrangement embodying the present invention. In the illustrated example, the vehicle impact energy absorption arrangement includes a vehicle frame assembly 12, a slider suspension arrangement 14 coupled to the vehicle frame assembly 12, and an impact force absorbing arrangement 16.

The vehicle frame assembly 12 includes a pair of longitudinally-extending frame members, of which frame member 18 is illustrated in FIG. 1. The frame assembly 12 also includes a plurality of cross-wise extending frame members (not shown).

Figure 2:
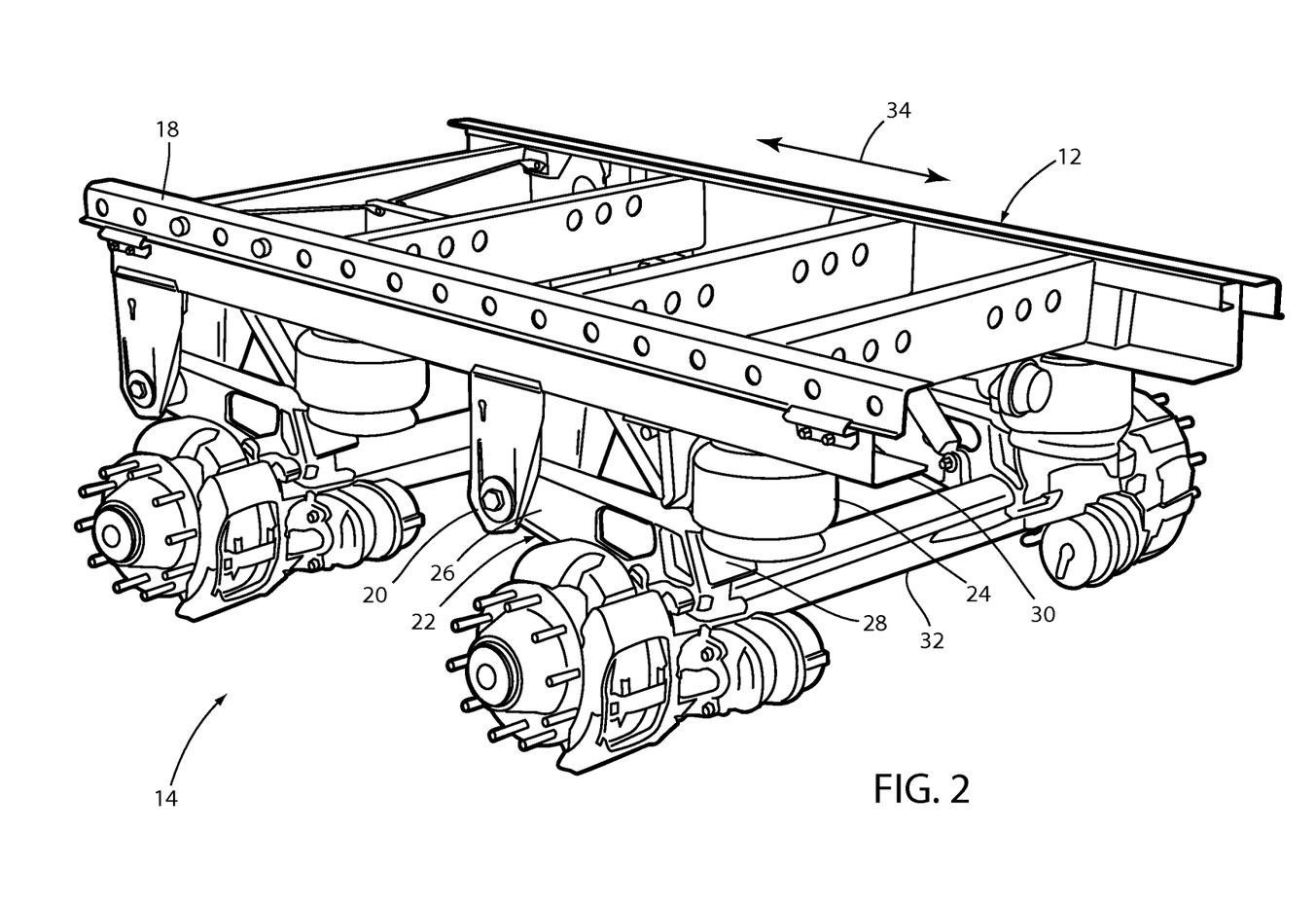
FIG. 2 is a perspective view of a vehicle slider suspension arrangement.

The vehicle slider suspension arrangement 14 (FIG. 2) comprises a plurality of support brackets 20 pivotably supporting corresponding trailing arms 22, and spring members in the form of pneumatic springs 24. Each trailing arm 22 includes a first end 26 pivotably coupled to a support bracket 30, and a second end 28 configured such that the pneumatic spring 24 is operably positioned between the second end 28 of the trailing arm 22 and a slider rail 30 of the slider suspension arrangement 14 as well as the frame member 18 of the vehicle frame assembly 12. An axle member 32 extends between pairings of the trailing arms 22 located on opposite sides of the associated vehicle. The slider suspension arrangement 14 is longitudinally adjustable in the directions 34 with respect to the vehicle frame assembly 12.

In the illustrated example, the impact force absorbing arrangement 16 includes a mounting member 40 coupled to the vehicle frame assembly 12, a first pivot arrangement 42 pivotably coupled to the mounting member for pivoting about a pivot axis 44, and a second pivot arrangement 46 pivotably coupled to the mounting member 40 for pivoting about a pivot axis 48, and a biasing member 50 operably positioned between the first and second pivot arrangements 42, 46 and the mounting member 40. In the illustrated example, the first pivot arrangement 42 includes a pivot arm 52 having a downwardly-extending portion 54 and a rearwardly-extending portion 56. The biasing member 50 is positioned between the rearwardly-extending portion 56 of the biasing member 50 and the mounting member 40. The second pivot arrangement 46 includes a downwardly-extending portion 58 and a forwardly-extending portion 60. The biasing member 50 is operably positioned between the forwardly-extending portion 60 of the second pivot arrangement 46 and the mounting member 40. The biasing member 50 may comprise a pneumatic spring, a hydraulic damper, a rubber bushing, and the like.

Figure 3:
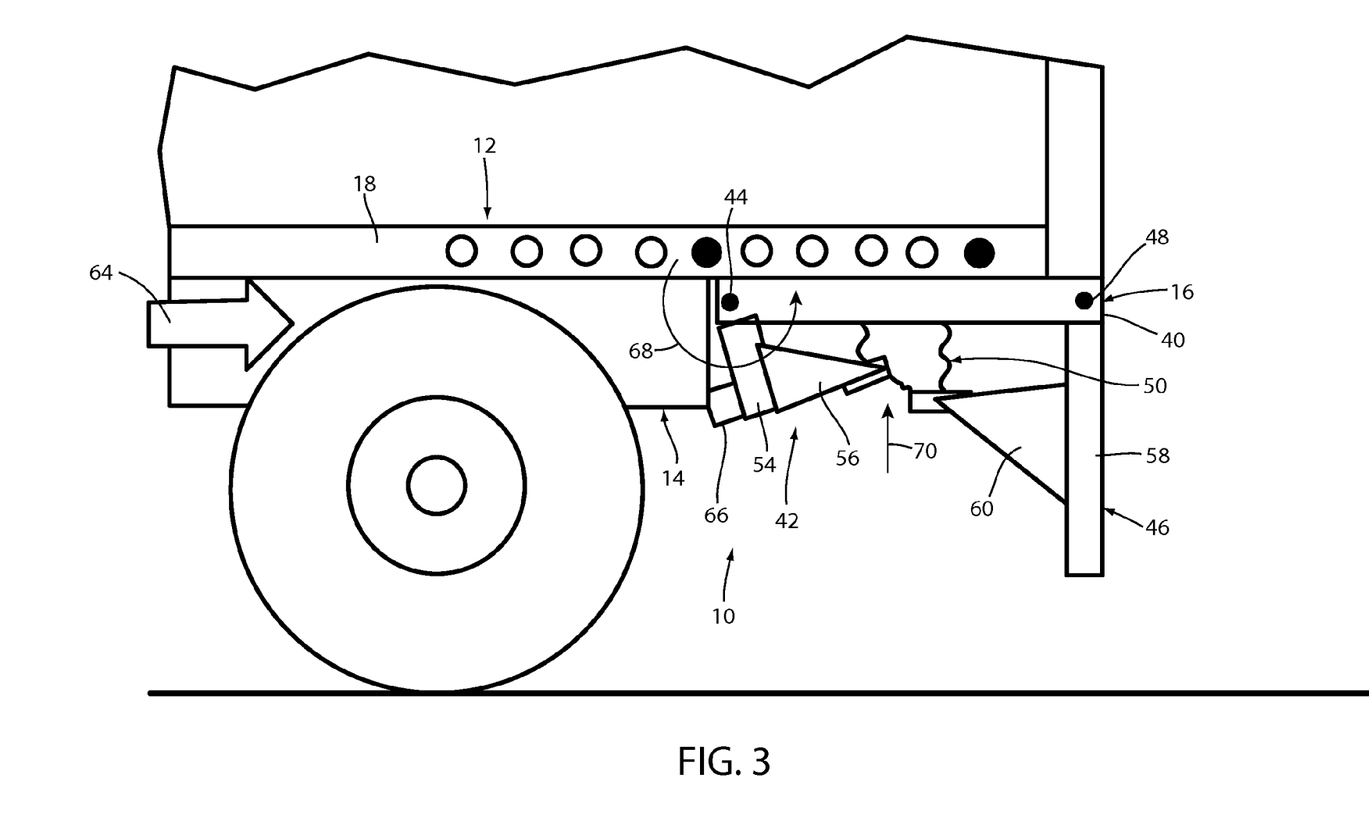
FIG. 3 is a partial side elevational view of the vehicle impact energy absorption arrangement, wherein a slider suspension arrangement has impacted the impact force absorbing arrangement.

In operation, and as best illustrated in FIG. 3, the impact force absorption arrangement 16 is adapted to absorb the impact between the slider suspension arrangement 14 and the impact force absorbing arrangement 16, thereby reducing the forces exerted by the slider suspension arrangement 14 on the vehicle frame assembly 12. Specifically, excessive forces generated on the overall system during position adjustment of the slider suspension arrangement 14 with respect to the vehicle frame assembly 12 may result in damage to the slider suspension arrangement 14, the vehicle frame assembly 12, or both. In the illustrated example, the slider suspension arrangement 14 is moved rearwardly in a direction 64 until the slider suspension arrangement 14 impacts a bumper member 66 positioned on a forward side of the downwardly-extending portion 54 of the first pivot arrangement 42. Impact of the slider suspension arrangement 14 with the bumper member 66 causes the first pivot arrangement 42 to pivot about the pivot axis 48 in a direction 68, thereby causing the rearwardly-extending portion 56 of the first pivot arrangement 42 to compress the biasing member 50 in a direction 70. The biasing member 50 absorbs the impact energy exerted by the slider suspension arrangement 14 and reduces or eliminates any damage to the slider suspension arrangement 14 and/or the vehicle frame assembly 12.

Figure 4:
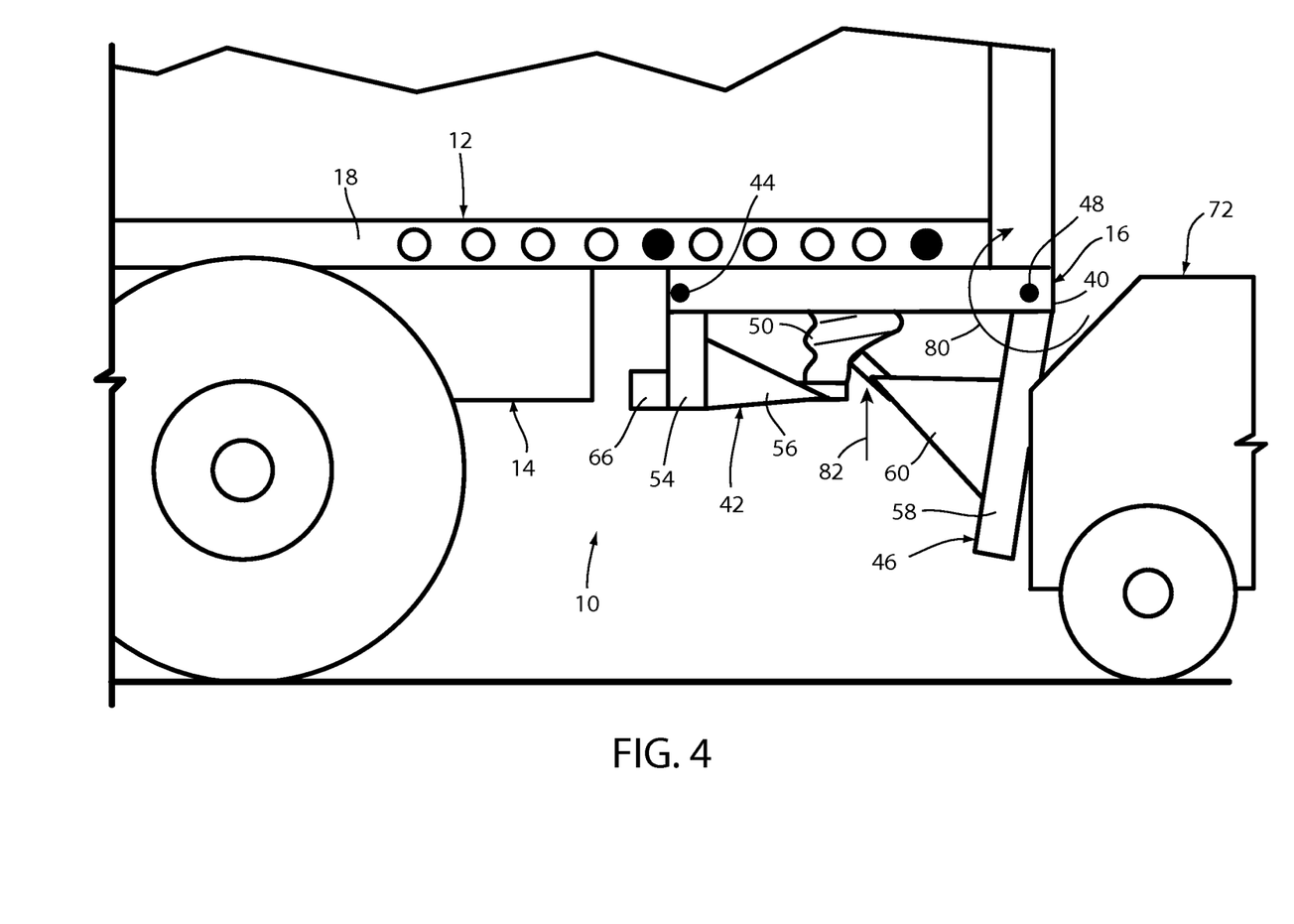
FIG. 4 is a partial side elevational view of the vehicle impact energy absorption arrangement, wherein the impact force absorbing arrangement has been impacted by a secondary vehicle.

As best illustrated in FIG. 4, a rear impact collision of a secondary vehicle 72 with the downwardly-extending portion 58 of the second pivot arrangement 46 causes the second pivot arrangement 46 to rotate about the pivot axis 48 in a direction 80, thereby causing the forwardly-extending portion 60 of the second pivot arrangement 46 to compress the biasing member 50 in a direction 82. The biasing member 50 is adapted to absorb the energy exerted by the secondary vehicle 72 onto the second pivot arrangement 46, thereby ensuring the safety of the passengers in the secondary vehicle 72, and simultaneously reducing the damage to the vehicle frame assembly 12 or the remainder of the vehicle.

Figure 5:
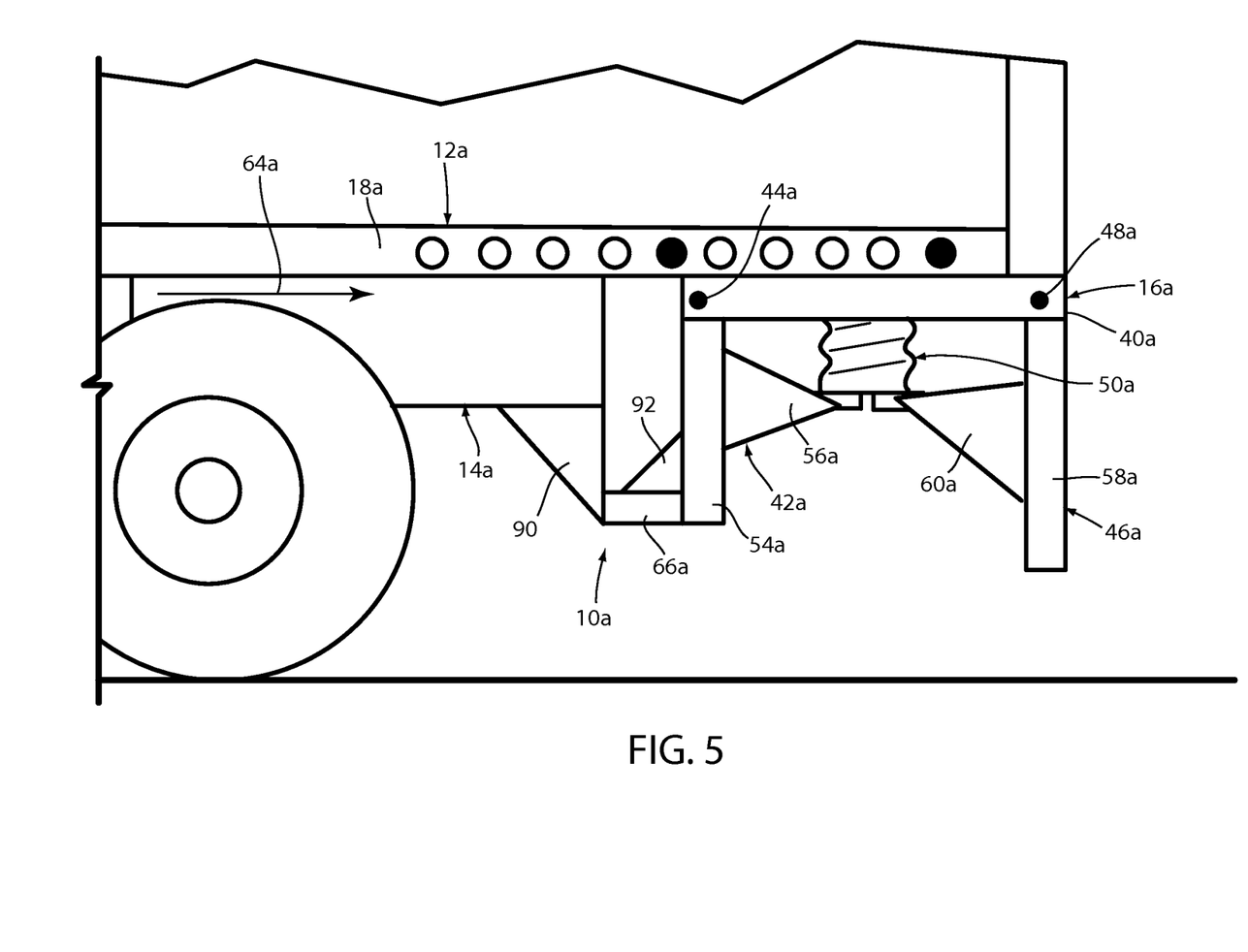
FIG. 5 is a partial side elevational view of an alternative embodiment of the vehicle impact energy absorption arrangement.

FIG. 5 illustrates an alternative embodiment of the vehicle impact energy absorption arrangement 10a. Since the vehicle impact energy absorption arrangement 10a is similar to the previously described vehicle energy absorption arrangement 10, similar parts appearing in FIGS. 1-4 and FIG. 5, respectively are represented by the same, corresponding reference numeral, except for the suffix "a" in the numerals of the latter. In the illustrated example, the vehicle impact energy absorption arrangement 10a is configured to lower the reaction point of the arrangement to a position equal to or below a center of mass of the slider suspension arrangement 14. Specifically, the suspension arrangement 14 includes a brace 90 that is configured to abut the bumper member 66a during rearward movement of the slider suspension arrangement 14a in the direction 64a. A structural reinforcement member 92 structurally reinforces and attaches the bumper member 66a to the downwardly-extending portion 54a of the first pivot arrangement 42a. The location and configuration of the brace 90 lowers the reaction point of the forces exerted on the slider suspension arrangement 14 during position adjustment of the suspension slider assembly arrangement with respect to the vehicle frame assembly, to a position below the slider suspension arrangement 14, thus generating a moment that forces the slider suspension arrangement 14 in an upward direction as opposed to forcing the slider suspension arrangement away from the vehicle frame assembly 12. The vehicle impact energy absorption arrangement 10a is also configured to provide improved aerodynamic efficiencies. Specifically, the brace 90 may be configured to act as an aerodynamic shield or windbreak. Further, the configuration and positioning of the above-described components of the vehicle impact energy absorption arrangement 10a may serve to reduce the wind drag associated with the overall assembly by forcing airflow completely or significantly below the vehicle impact energy absorption arrangement 10a.

The present inventive vehicle impact energy absorption arrangement can be easily and quickly assembled, may be retrofit onto existing trailer assemblies, is economical to manufacture, capable of a long operating life, reduces damage typically associated with excessive force being applied by an operator to a slider suspension assembly, increases the safety of passengers in a vehicle that collides with the rear of a trailer assembly while simultaneously reducing the damage to the trailer typically associated with rear collisions, and is particularly well adapted for the proposed use.

In In the foregoing description, it will be readily appreciated by those skilled in the art that modifications may be made to the invention without departing from the concepts as disclosed herein. Such modifications are to be considered as included in the following claims, unless these claims by their language expressly state otherwise.

The invention claimed is:

1. A vehicle impact energy absorption arrangement, comprising:
   a vehicle frame;
   a slider suspension arrangement coupled to the vehicle frame, the slider suspension arrangement comprising:
      an axle member; and
      a spring member operably positioned between the axle member and the vehicle frame; and
   an impact force absorbing arrangement comprising:
      a mounting member coupled to the vehicle frame;
      a first pivot member pivotably coupled to the mounting member;
      a second pivot member pivotably coupled to the mounting member; and
      at least one elastically deformable biasing member positioned between the first pivot member and the mounting member and between the second pivot member and the mounting member;
      wherein the first pivot member is configured to pivot and elastically deform the at least one biasing member when impacted by the slider suspension arrangement; and
      wherein the second pivot member is configured to pivot and elastically deform the at least biasing member when the second pivot member receives a forwardly directed force.

2. The vehicle impact energy absorption arrangement of claim 1, wherein the slider suspension arrangement further comprises at least one trailing arm member having a first end and a second end, and a support bracket coupled to the vehicle frame and pivotably supporting the first end of the at least one trailing arm, wherein the spring member is positioned between the second end of the trailing arm and the vehicle frame.

3. The vehicle impact energy absorption arrangement of claim 1, wherein the at least one elastically deformable biasing member abuts at least one of the mounting member and the first pivot member.

4. The vehicle impact energy absorption arrangement of claim 3, wherein the at least one elastically deformable biasing member abuts at least one of the mounting member and the second pivot member.

5. The vehicle impact energy absorption arrangement, comprising:
   a vehicle frame;
   a slider suspension arrangement coupled to the vehicle frame, the slider suspension arrangement comprising:
      an axle member; and
      a spring member operably positioned between the axle member and the vehicle frame; and
   an impact force absorbing arrangement comprising:
      a mounting member coupled to the vehicle frame;
      a first pivot member pivotably coupled to the mounting member; and
      at least one elastically deformable biasing member positioned between the first pivot member and the mounting member;
      wherein the first pivot member is configured to pivot and elastically deform the at least one biasing member when impacted by the slider suspension arrangement.

6. The vehicle impact energy absorption arrangement of claim 5, wherein the at least one elastically deformable biasing member abuts at least one of the mounting member and the first pivot member.

7. The vehicle impact energy absorption arrangement of claim 5, wherein the impact force absorbing arrangement further comprises a second pivot member pivotably coupled to the mounting member, wherein the at least one elastically deformable biasing member is positioned between the second pivot member and the mounting member, and wherein the second pivot member is configured to pivot and elastically deform the at least one biasing member when the second pivot member receives a forwardly directed force.

8. The vehicle impact energy absorption arrangement of claim 7, wherein the at least one elastically deformable biasing member abuts at least one of the mounting member and the first pivot member.

9. The vehicle impact energy absorption arrangement of claim 8, wherein the at least one elastically deformable biasing member abuts at least one of the mounting member and the second pivot member.

10. The vehicle impact energy absorption arrangement of claim 5, wherein the slider suspension arrangement further comprises at least one trailing arm member having a first end and a second end, and a support bracket coupled to the vehicle frame and pivotably supporting the first end of the at least one trailing arm, wherein the spring member is positioned between the second end of the trailing arm and the vehicle frame.

11. A vehicle impact energy absorption arrangement, comprising:
   a vehicle frame;
   a slider suspension arrangement coupled to the vehicle frame, the slider suspension arrangement comprising:
      an axle; and
      a spring member operably positioned between the axle and the vehicle frame; and
   an impact force absorbing arrangement comprising:
      a mounting member coupled to the vehicle frame;
      a first pivot member pivotably coupled to the mounting member; and
      at least one elastically deformable biasing member positioned between the first pivot member and the mounting member;
      wherein the first pivot member is configured to pivot and elastically deform the at least one biasing member when impacted by the slider suspension arrangement.

12. The vehicle impact energy absorption arrangement of claim 11, wherein the at least one elastically deformable biasing member abuts at least one of the mounting member and the first pivot member.

13. The vehicle impact energy absorption arrangement of claim 6, wherein the impact force absorbing arrangement further comprises a second pivot member pivotably coupled to the mounting member, wherein the at least one biasing member is positioned between the second pivot member and the mounting member, and wherein the second pivot member is configured to pivot and elastically deform.

14. The vehicle impact energy absorption arrangement of claim 13, wherein the at least one elastically deformable biasing member abuts at least one of the mounting member and the first pivot member.

15. The vehicle impact energy absorption arrangement of claim 13, wherein the at least one elastically deformable biasing member abuts at least one of the mounting member and the second pivot member.

16. The vehicle impact energy absorption arrangement of claim 6, wherein the slider suspension arrangement further comprises at least one trailing arm member having a first end and a second end, and a support bracket coupled to the vehicle frame and pivotably supporting the first end of the at least one trailing arm, wherein the spring member is positioned between the second end of the trailing arm and the vehicle frame.

17. A vehicle impact force absorbing arrangement for use on a vehicle that includes a slider suspension arrangement, comprising:
- a mounting member coupled to the vehicle frame;
- a first pivot member pivotably coupled to the mounting member;
- a second pivot member pivotably coupled to the mounting member; and
- at least one elastically deformable biasing member positioned between the first pivot member and the mounting member and between the second pivot member and the mounting member;
- wherein the first pivot member is configured to pivot and elastically deform the at least one biasing member when impacted by the slider suspension arrangement; and
- wherein the second pivot member is configured to pivot and elastically deform the at least one biasing member when the second pivot member receives a forwardly directed force.

18. The vehicle impact force absorbing arrangement of claim 17, wherein the at least one elastically deformable biasing member abuts at least one of the mounting member and the first pivot member.

19. The vehicle impact force absorption arrangement of claim 18, wherein the at least one elastically deformable biasing member abuts at least one of the mounting member and the second pivot member.

* * * * *